United States Patent
Jansen

(10) Patent No.: US 6,179,303 B1
(45) Date of Patent: Jan. 30, 2001

(54) DEVICE FOR ACCOMODATING A TOOL OR A SUPPORT ELEMENT IN A MACHINE TOOL OR A SPINDLE

(75) Inventor: Karlheinz Jansen, Schutterwald (DE)

(73) Assignee: WTO Werkzeug - Einrichtugen GmbH, Ohlsbach (DE)

( * ) Notice: Under 35 U.S.C. 154(b), the term of this patent shall be extended for 0 days.

(21) Appl. No.: 09/147,921

(22) PCT Filed: Jul. 17, 1998

(86) PCT No.: PCT/DE98/02052

§ 371 Date: Mar. 17, 1999

§ 102(e) Date: Mar. 17, 1999

(87) PCT Pub. No.: WO99/03628

PCT Pub. Date: Jan. 28, 1999

(30) Foreign Application Priority Data

Jul. 17, 1997 (DE) ................................. 197 30 584

(51) Int. Cl.[7] .................. B23B 31/10; B23B 31/107; B23B 31/18

(52) U.S. Cl. .................. 279/91; 279/35; 279/36; 279/49; 279/80; 279/90; 279/103; 279/143; 279/904; 408/239 R; 408/239 A; 409/234

(58) Field of Search .................. 279/35–38, 40, 279/78, 80, 89, 90, 91, 103, 904, 23.1, 42, 48, 49, 143–145; 408/239 R, 239 A; 409/232, 234

(56) References Cited

U.S. PATENT DOCUMENTS

| | | | |
|---|---|---|---|
| 748,398 | * 12/1903 | Middleton | 279/103 |
| 1,062,630 | * 5/1913 | Becker | 279/91 |
| 1,815,611 | 7/1931 | Brown . | |
| 2,442,444 | 6/1948 | Tautz . | |
| 2,511,416 | * 6/1950 | Rundorff | 279/89 |
| 2,579,082 | * 12/1951 | Kramer | 279/103 |
| 2,670,214 | * 2/1954 | Fishwick | 279/36 |
| 3,599,996 | * 8/1971 | Holt | 279/37 |
| 3,884,120 | * 5/1975 | Diferdinando | 279/103 |
| 4,062,552 | * 12/1977 | Kitaguchi | 279/103 |
| 4,162,080 | * 7/1979 | Buck | 279/48 |

FOREIGN PATENT DOCUMENTS

| | | | |
|---|---|---|---|
| 2347816 | * 6/1974 | (DE) | 279/103 |
| 3314231 | * 10/1984 | (DE) | 279/904 |
| 27680 | 11/1911 | (GB) . | |

* cited by examiner

Primary Examiner—Steven C. Bishop
(74) Attorney, Agent, or Firm—Gudrun E. Huckett Patent Agent

(57) ABSTRACT

A device for receiving a tool or support element in a machine tool or spindle has a tool carrier receiving member arranged in a machine tool or spindle and a tool carrier having a tool receiving member for a tool as well as a clamping device for securing the tool carrier in the tool carrier receiving member. The tool carrier has two areas, wherein a first area includes the tool receiving member and wherein a second area is designed to be received in the tool carrier receiving member. The second area includes the clamping device. The two areas are merged with one another in the axial direction of the device by overlapping the areas.

11 Claims, 3 Drawing Sheets

DEVICE FOR ACCOMODATING A TOOL OR A SUPPORT ELEMENT IN A MACHINE TOOL OR A SPINDLE

BACKGROUND OF THE INVENTION

The invention relates to a device for accommodating a tool or a support element in a machine tool or spindle, the device comprising a tool carrier receiving member arranged at the machine tool or spindle, comprising a tool carrier having a tool receiving member for the tool as well as a clamping device for fixation of the tool carrier at the tool carrier receiving member.

Known devices for receiving a driven or stationary tool (for example, a cutting tool) or any other parts (for example, a support element for a measuring device) in a machine tool or spindle have a tool carrier receiving member which is either arranged as a separate part at the machine tool or is a part of the machine tool itself. Furthermore, a tool carrier is provided which has a tool receiving member for the tool. In order to be able to securely connect this tool carrier receiving member with the tool carrier in a permanent manner, a clamping device is provided. For this purpose, the tool carrier is divided into two areas, i.e., a first area for the tool receiving member and a second area to be received in the machine part or spindle part whereby in this second area the clamping device is arranged in the interior of the tool carrier. This arrangement of the clamping device results in the total length of the tool carrier being the sum of the two aforementioned areas. As a result of machine tools that have been recently introduced into the market and have a more limited work space the large constructive size of the tool carrier is disadvantageous.

It is therefore an object of the invention to provide a tool carrier of a short length.

SUMMARY OF THE INVENTION

As a technical solution it is suggested with the invention that the two areas of the tool carrier i.e., the tool receiving member as well as the area to be received in the tool carrier receiving member including the clamping device, are merged in the axial direction by overlapping their longitudinal areas.

This provides a tool carrier changing system of a compact design for rotating as well as stationery tools or for any other parts (for example, for a support element for a measuring device). The basic idea of the inventive tool carrier changing system is that the two areas of the tool carrier, i.e., the area for the tool receiving member and the area to be received in the machine part or the spindle part, are merged with one another. This is to be understood such that the two areas are radially spaced from one another, whereby the area for the tool receiving member is positioned inwardly, that however, in the axial direction the areas overlap. The inventive integration of the tool receiving member of the tool carrier into the area of the tool carrier receiving member results in the aforementioned advantage of a short length. This short length furthermore results in minimal torque at the interface caused by the transverse forces during machining and thus provide a very stiff basic construction. Furthermore, for the axial tool preadjustments the adjusting elements are freely accessible from the rear. Moreover, it is possible with a suitable embodiment of the clamping device to provide very high pretension. Finally, the construction makes it possible for driven tools to arrange the tool carrier receiving member below the first spindle bearing. This results in short leverage, minimal deformation and yielding. Overall, a very short device thus is provided with the tool carrier as a continuous modular tool system that allows to employ on multi spindle machines and in connection with all other machines within shortest constructive spaces to use tool changing systems with the aforementioned advantages of the known systems.

An advantageous embodiment suggests that as a clamping device a clamping ring is to be provided at the exterior of the tool carrier which engages directly or indirectly and which secures the tool carrier between it and the tool carrier receiving member. The basic principle is that the clamping device is not arranged in the interior of the tool carrier adjacent to the tool receiving member but to provide as a clamping device a clamping ring which is positioned externally at the housing of the tool carrier and thus can thus be located in the same cross-sectional plane as the tool receiving member. Accordingly, the merging of the two areas of the tool carrier is realized. The inventive device has thus three principle components, i.e., the tool carrier receiving member, furthermore, the actual tool carrier, and finally the tool carrier clamping device in connection with the inventive clamping ring. The tool carrier receiving member may have a cylindrical centering device with a planar end face stop, the tool carrier may have a centering cylinder also with a planar end face stop and a tool receiving member as well as finally the clamping ring as a fastening means. Inasmuch as the clamping ring engages directly the tool carrier, a direct mechanical contact between the clamping ring and the tool carrier is provided. An indirect engagement of the clamping ring at the tool carrier is to be understood such that an additional intermediate element is positioned between the clamping ring and the tool carrier which is transferred by the clamping ring into the securing position and is then responsible for the securing of the tool carrier between the tool carrier receiving member and the clamping ring.

An advantageous embodiment suggests that the clamping ring has a radially inwardly oriented abutment surface as a direct or indirect counter surface to a corresponding abutment surface of the tool carrier. This provides a technically simple solution in order to secure by the inventive clamping ring the tool carrier between the clamping ring and the tool carrier receiving member. In the "direct" variant the abutment surface engages directly at the corresponding contour abutment surface of the tool carrier. In the "indirect" variant intermediate elements are provided between the abutment surface of the clamping ring and the counter abutment surface of the tool carrier, as will be explained in the following.

A further embodiment for a "direct" variant suggests that the abutment surface of the clamping ring has an inner diameter that is smaller than the outer diameter of the tool carrier. The clamping ring is thus embodied relative to its radial contour such that due to the corresponding end face contour of the tool carrier the latter is forced by the clamping ring by a positive-locking connection against the tool carrier receiving member.

An "indirect" variant suggests that the abutment surface of the clamping ring has an inner diameter that is greater than the outer diameter of the tool carrier, that the abutment surface at its inner side toward the axis of the clamping ring has a slanted guide surface, and that in the area of the abutment surface of the clamping ring a securing element is arranged which, in the initial position without fixation of the clamping ring, has a greater inner diameter than the outer diameter of the tool carrier and which, after transfer of the clamping ring into the securing position has a smaller inner diameter than the outer diameter of the tool carrier. The basic principle of this "indirect" variant is that the clamping ring upon changing the tool carrier must not be completely removed but must only be loosened to such an extent that the securing element or securing elements have widened so much that the exchangeable tool carrier is released and can be removed through the front opening of the clamping ring. The abutment surface in this context is substantially conical whereby the tip of the cone is positioned on the axis of the clamping ring counter to the direction of transfer of the clamping ring into the securing position. This means that upon transfer of the clamping ring into the securing position the cross-section of the clamping ring in the area of the slanted guide surface is reduced with the effect that the securing element is moved radially inwardly, resulting in a diameter reduction.

As a securing element a slotted spring ring can be provided, especially a steel ring. With this special arrangement it is possible to insert the tool carrier in the loosened position into the tool carrier receiving member. The subsequent tightening of the clamping ring with the resulting axial movement then moves the metal ring along the slant provided at the clamping ring inwardly and brings it into abutment at the shoulder of the tool carrier.

As an alternative, the securing elements may also be pivotable levers. Advantageously, about the periphery of the tool carrier a plurality of such levers are arranged. The levers act as clamping segments which are moved inwardly by the clamping ring into the clamping position so that the levers engage across the tool carrier and secure it thereby. In the release position, the levers can be opened by pivoting them outwardly to such an extent that the diameter of the tool carrier will pass through. The design of the clamping elements moreover provides an additional force increase.

Preferably, the levers are pivoted outwardly by a spring element in the spring-loaded basic position. The spring element may be, for example, an O ring.

As an alternative it is suggested that the securing element is a spring ring with lever-like spring tongues. The basic idea is the same as with the aforementioned levers. In this (the last) alternative, the levers can be imagined as part of a spring ring whereby the individual levers are produced by cuts in the complete spring ring. The ring is comprised of spring steel, and the levers are thus essentially spring tongues. The clamping ring then pivots the spring tongues inwardly into the clamping position.

A further embodiment of the inventive device suggests that the clamping ring is threaded by a thread directly onto the tool carrier receiving member and/or by a bayonet closure directly onto the tool carrier receiving member. This provides a simple possibility for the arrangement and force transmission of the clamping ring with respect to connecting to the tool carrier receiving member.

In an alternative it is also possible that the spring ring is axially movable by a clamping nut. In this case, the clamping nut must be threaded externally onto the clamping ring. The combination of a left-handed thread with a right handed thread can result in travel stroke doubling.

BRIEF DESCRIPTION OF THE DRAWINGS

Three embodiments of the inventive device with reception of a tool in a machine tool is disclosed in the following with the aid of the drawings. It is shown in.

DESCRIPTION OF PREFERRED EMBODIMENTS

Figure 1:
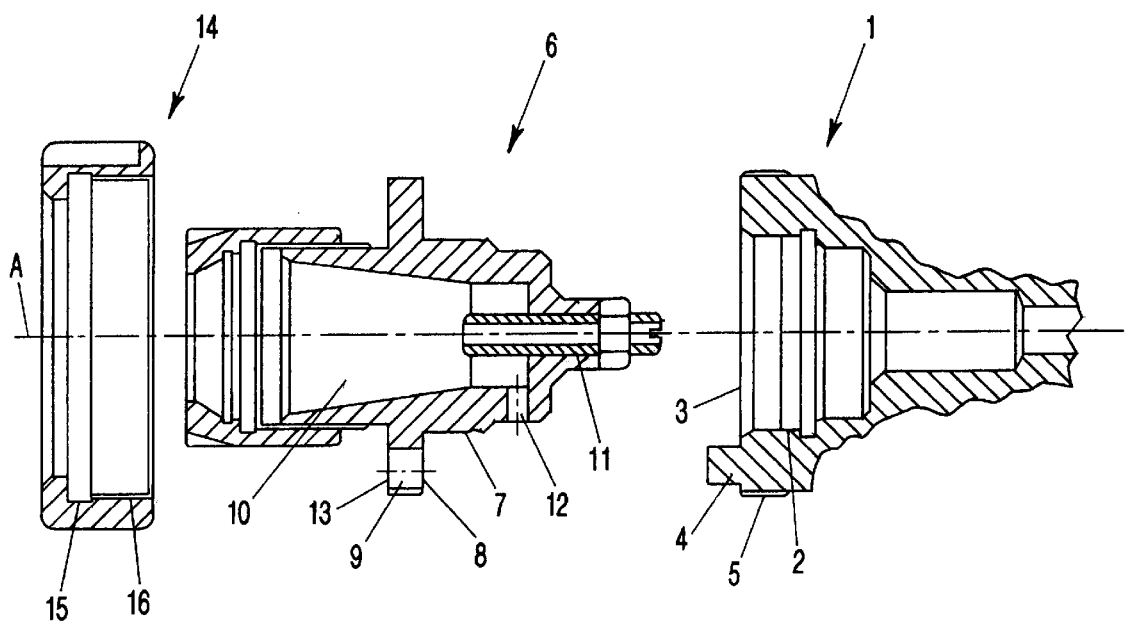
FIG. 1 in longitudinal section a first embodiment in an exploded view.
Figure 2:
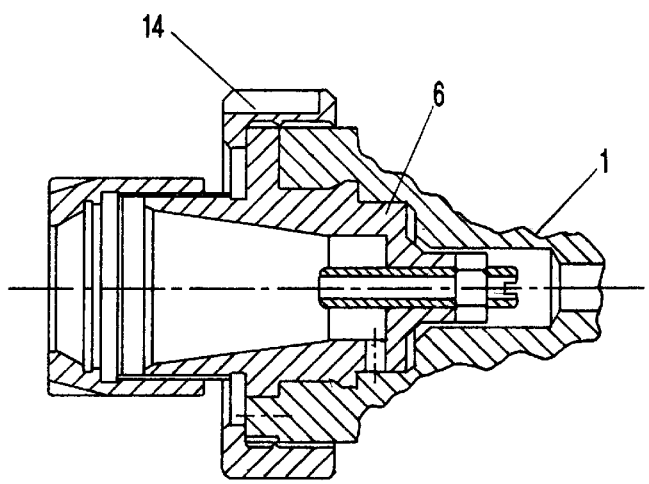
FIG. 2 the device of FIG. 1 in the assembled state.
Figure 3:
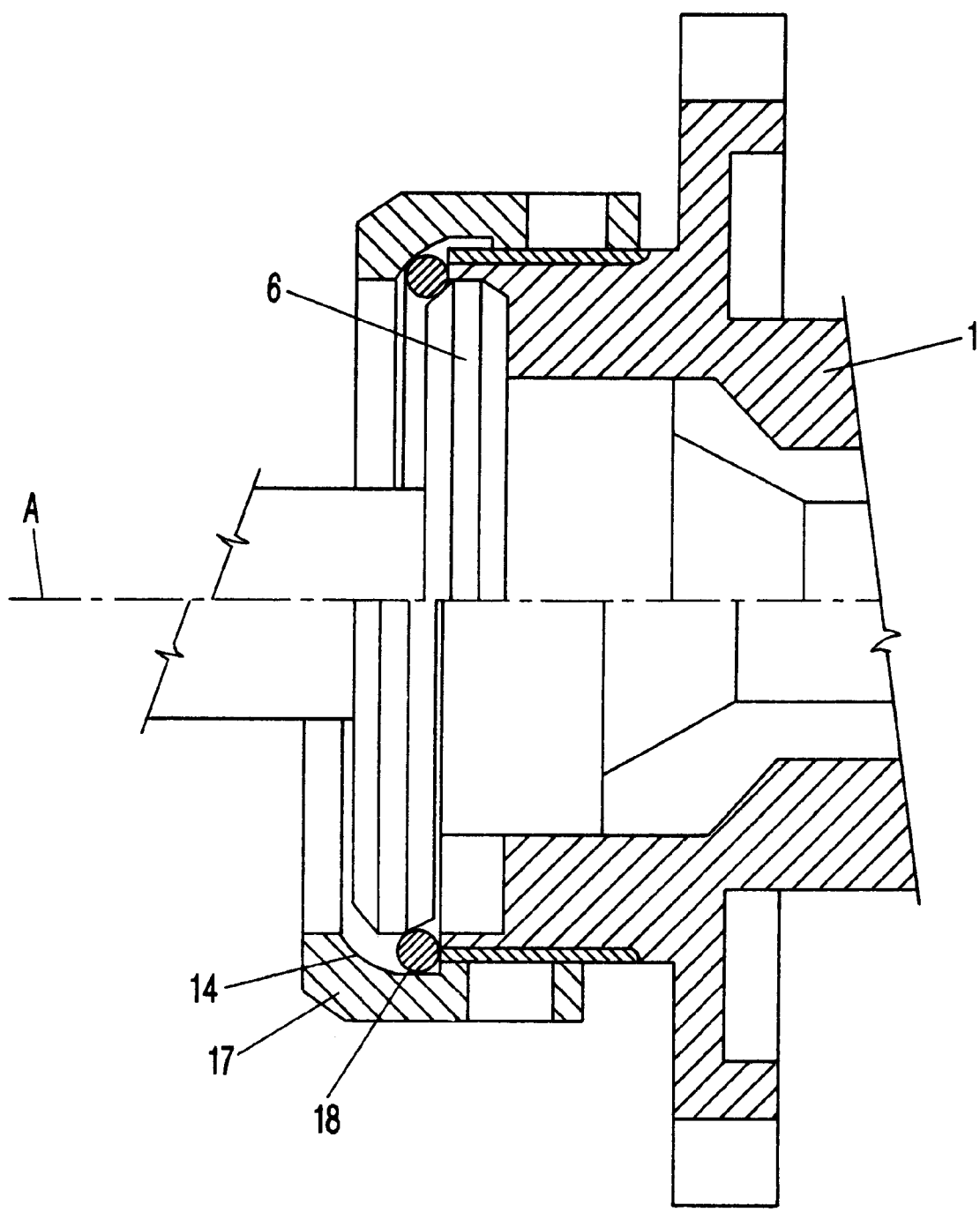
FIG. 3 a second embodiment with a slotted steel ring.
Figure 4:
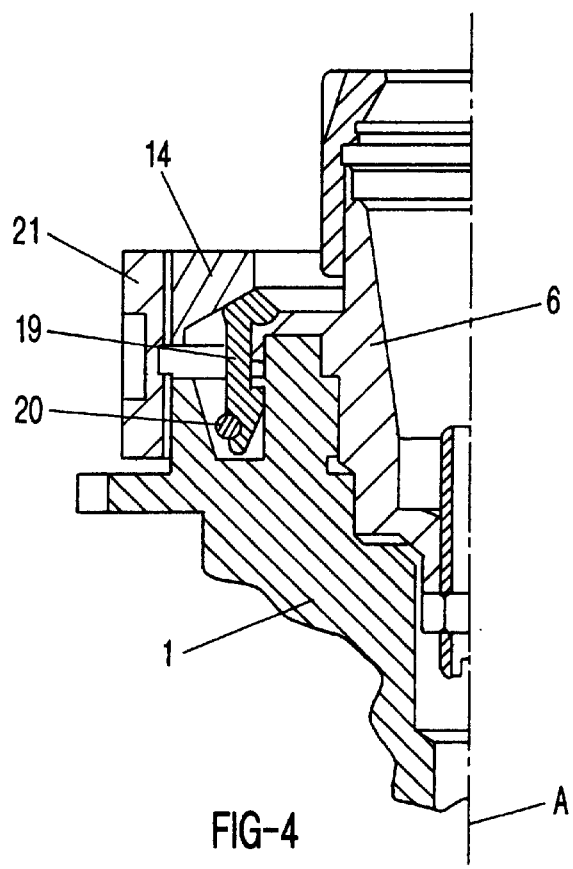
FIG. 4 a third embodiment with pivotal levers in the securing position.
Figure 5:
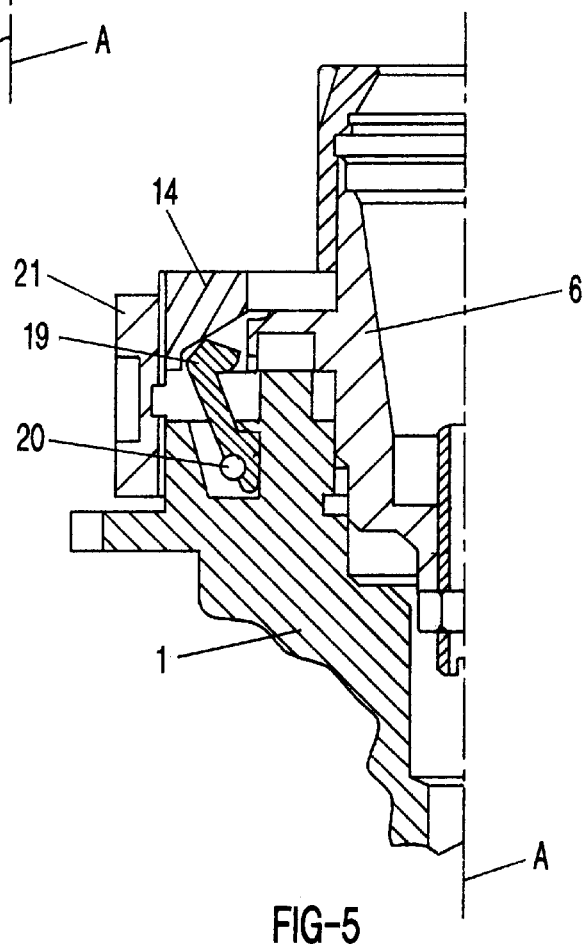
FIG. 5 a representation based on FIG. 4 but in the open position.

In FIGS. 1 and 2 a first embodiment, in FIG. 3 a second embodiment, and in FIGS. 4 and 5 a third embodiment of the inventive device for receiving a tool in a machine tool is represented.

The first embodiment in FIGS. 1 and 2 comprises a tool carrier receiving member 1 which is correlated with a non-represented machine tool. This tool carrier receiving member 1 has a cylindrical centering device 2 as well as a planar end face stop 3 and furthermore a bolt-shaped fixation 4 for receiving excessive torque and for angular alignment as well as a counter thread 5 for a tool carrier clamping device.

As a further component a tool carrier 6 is provided. This tool carrier 6 has a centering cylinder 7 as well as a planar end face stop 8, and furthermore a cutout 9 for position fixations, matching the bolt-shaped fixation 4 of the tool carrier receiving member 1, a tool receiving member 10, an axial basic adjusting device 11 for the tools, channels 12 for the cooling medium as well as an abutment surface 13 for the tool carrier clamping action.

Finally, the tool carrier changing system for the tool carrier device has a clamping ring 14 which engages about the tool carrier 6. It comprises a radially inwardly directed abutment surface 15 and for this purpose is crimped radially inwardly with an L-shaped cross-sectional profile. Furthermore, the clamping ring 14 has inner thread 16.

The tool carrier changing system in the first embodiment of FIGS. 1 and 2 functions as follows.

The tool carrier 6 is inserted with its centering cylinder 7 into the cylindrical centering device 2 of the tool carrier receiving member 1. The planar end face stop 8 of the tool carrier 6 comes into contact with the planar end face stop 3 of the tool carrier receiving member 1. Furthermore, the cutout 9 of the tool carrier 6 will come to rest at the bolt-shaped position fixation 4 of the tool carrier receiving member 1. Subsequently, the clamping ring 14 with its inner thread 16 is threaded onto the counter thread 5 of the tool carrier receiving member 1 to such an extent that the abutment surface 15 of the clamping ring 14 will come to rest at the abutment surface 13 of the tool carrier 6 so that the tool carrier 6 is secured between the tool carrier receiving member 1 and the clamping ring 14. When a change of the tool carrier 6 is desired, the clamping ring 14 is removed and after changing of the tool carrier 6 is again threaded thereon.

The embodiment in FIG. 3 has the same basic components tool carrier receiving member 1, tool carrier 6, and clamping ring 14. While in the first embodiment of FIGS. 1 and 2 the inner diameter of the clamping ring 14 in the area of the abutment surface 15 was smaller than the outer diameter of the tool carrier 6, in this second embodiment of FIG. 3 the inner diameter of the clamping ring 14 in the area of the abutment surface 15 is greater than the outer diameter of the tool carrier 6. The difference lies in that in the second embodiment the abutment surface 15 is embodied as a guide surface 17 and that, furthermore, a slotted spring ring 18 made of metal is provided.

The function of this second embodiment of FIG. 3 is as follows.

FIG. 3 shows in the left half the state of the device before securing of the tool carrier 6 at the tool carrier receiving member 1. It can be seen that the ring 18 rests at the inner mantle surface of the clamping ring 14 by its own tension and that the inner diameter of the ring 18 is greater than the outer diameter of the tool carrier 6. When threading the clamping ring 14 into the securing position, the ring 18 is radially moved inwardly by the guide surface 17 at the clamping ring 14 so that such an inner diameter reduction results that the ring 18 will come to rest at the shoulder of the tool carrier 6 such that it can no longer pass through the end face opening in the clamping ring 14. This is shown in FIG. 3 in the right half.

The advantage of such an embodiment is that for changing the tool carrier 6 the clamping ring 14 must not completely be removed from the tool carrier receiving member 1. It is only required to move the clamping ring 14 by a few revolutions such in the axial direction that the ring 18 has its maximum diameter position. In this position, the tool carrier 6 can then be removed from the tool carrier receiving member 1 and can be exchanged for another tool carrier 6.

The third embodiment in FIGS. 4 and 5 is based, in principle, on the same design as the second embodiment of FIG. 3. Instead of the slotted ring 18, levers 19 are provided which are pivotal at a rolling surface within the tool carrier receiving member 1. Furthermore, one spring element 20 in the form of an O-ring pushes the lever 19 outwardly. The free ends of the levers 19 are angled relative to the axis A of the clamping ring 14 and correspond to the slanted guide surface 17 of the clamping ring 14. The clamping ring 14 is actuated, i.e., moved in the axial direction, by a clamping nut 21 which in the area of the tool carrier receiving member 1 has a left-handed thread and in the area of the clamping ring 14 a right-handed thread (or vice versa).

The third embodiment in FIGS. 4 and 5 functions as follows.

The securing position is represented in FIG. 4, i.e., the clamping ring 14 is in its secured position in which the guide surface 14 of the clamping ring 14 has pivoted the lever 19 inwardly to such an extent that the angled ends of the levers 19 engage the tool carrier 6 to be secured. In order to change the tool carrier 6, the clamping nut 21 is rotated such that the clamping ring 14 will perform a travel stroke. The oppositely oriented threads of the clamping nut 21 results in a doubling of the travel stroke length. The stroke movement of the clamping ring 14 pivots the levers 19 outwardly to thus release the tool carrier 6 so that it can be removed from the tool carrier receiving member 1.

The advantage of this third embodiment is that for changing the tool carrier 6 the clamping ring 14 must not be completely removed. It is only necessary to move the clamping ring 14 by a small amount in the axial directions so that the tool carrier 6 can be removed.

The specification incorporates by reference the entire disclosure of German priority document 197 30 584.9 of Jul. 17, 1997, as well as of International Application PCT/DE98/02052 of Jul. 17, 1998.

The present invention is, of course, in no way restricted to the specific disclosure of the specification and drawings, but also encompasses any modifications within the scope of the appended claims.

List of Reference Numerals

1 Tool carrier receiving member
2 Cylindrical centering device
3 Planar end face stop
4 Bolt-shaped position fixation
5 Counter thread
6 Tool carrier
7 Centering cylinder
8 Planar end face stop
9 Cutout
10 Tool receiving member
11 Axial adjusting device
12 Channel
13 Abutment surface
14 Clamping ring
15 Abutment surface
16 Inner thread
17 Guide surface
18 Ring
19 Lever
20 Spring element
21 Clamping nut
A Axis

What is claimed is:

1. Device for receiving a tool or support element in a machine tool or spindle, said device comprising:

a tool carrier receiving member (1) arranged in a machine tool or spindle;

a tool carrier (6) having a tool receiving member (10) for a tool and having a clamping device (14, 18, 19, 21) for securing said tool carrier (6) in said tool carrier receiving member (1);

said tool carrier (6) having two areas, wherein a first one of said areas comprises said tool receiving member (10) and wherein a second one of said areas is designed to be received in said tool carrier receiving member (1) and comprises said clamping device (14, 18, 19, 21);

wherein said two areas are merged with one another in an axial direction of said device by overlapping of said areas; and wherein said tool carrier receiving member (1) and said tool holder (6) each have a planar end face stop (3, 8), respectively, said planar end stops (3, 8) fitted into one another when said tool carrier receiving member (1) and said tool carrier (6) come into contact.

2. Device according to claim 1, wherein said clamping device comprises a clamping ring (14) engaging a periphery of said tool carrier (6) directly or indirectly, wherein said clamping ring (14) secures said tool carrier (6) between said clamping ring (14) and said tool carrier receiving member (1).

3. Device according to claim 1, wherein said clamping ring (14) has a radially inwardly oriented abutment surface (15) and wherein said tool carrier (6) has a matching counter abutment surface (13), wherein said abutment surface (15) of said clamping ring (14) engages directly or indirectly said counter abutment surface (13) of said tool carrier (6).

4. Device according to claim 3, wherein said abutment surface (15) of said clamping ring (14) has an inner diameter that is smaller than an outer diameter of said tool carrier (6).

5. Device according to claim 3, wherein:

said abutment surface (15) of said clamping ring (14) has an inner diameter that is greater than an outer diameter of said tool carrier (6);

said abutment surface (15) of said clamping ring (14) has an inner side facing an axis (A) of said clamping ring (14);

said inner side has a slanted guide surface (17);

said clamping device further comprises a securing element (18, 19, 20) arranged in the area of said abutment surface (15) of said clamping ring (14);

said securing element (18, 19, 20), in a non-securing initial position of said clamping ring (14), has an inner diameter that is greater than an outer diameter of said tool carrier (6);

said securing element (18, 19, 20), after transfer of said clamping ring (14) into a securing position, has an inner diameter that is smaller than said outer diameter of said tool carrier (6).

6. Device according to claim 5, wherein said securing element is a slotted spring ring (18).

7. Device according to claim 5, wherein said securing element comprises pivotable levers (19).

8. Device according to claim 7, wherein said securing element further comprises a spring element (20) and wherein said levers (19) are pivoted outwardly by said spring element (20) from a spring-loaded basic position.

9. Device according to claim 2, wherein said clamping ring (14) has a first thread (16) and wherein said tool carrier receiving member (1) has second thread (5) matching said first thread (16), wherein said clamping ring (4) and said tool carrier receiving member (1) are connected by threading said clamping ring (14) onto said tool carrier receiving member (1).

10. Device according to claim 2, wherein said clamping device further comprises a clamping nut (21) and wherein said clamping ring (14) is axially adjustable by said clamping nut (21).

11. The device according to claim 1, wherein the planar end face stop (3) of the tool carrier receiving member (1) has a bolt-shaped fixation (4) and the planar end face stop (8) of the tool carrier (6) has a corresponding cutout (9) for said fixation (4).

* * * * *